United States Patent [19]

Kawano

[11] Patent Number: 4,721,691

[45] Date of Patent: Jan. 26, 1988

[54] MAGNESIA CLINKER AND METHOD OF PRODUCING THE SAME

[75] Inventor: Fusao Kawano, Minamata, Japan

[73] Assignee: Shin Nihon Chemical Industry Co., Ltd., Osaka, Japan

[21] Appl. No.: 658,820

[22] Filed: Oct. 9, 1984

[30] Foreign Application Priority Data

Oct. 31, 1983 [JP] Japan ................... 58-202842
Oct. 31, 1983 [JP] Japan ................... 58-202843

[51] Int. Cl.$^4$ ............................................. C04B 35/04
[52] U.S. Cl. ..................... 501/108; 106/121; 501/122; 423/636; 423/637
[58] Field of Search .............. 106/121; 501/108, 123, 501/122; 423/636, 637

[56] References Cited

U.S. PATENT DOCUMENTS

| | | | |
|---|---|---|---|
| 2,579,781 | 12/1951 | Austin et al. | 501/108 |
| 3,808,014 | 4/1974 | Spencer et al. | 501/108 |
| 4,033,778 | 7/1977 | Gilpin et al. | 501/108 |
| 4,585,743 | 4/1986 | Yamamoto et al. | 501/108 |

FOREIGN PATENT DOCUMENTS

| | | | |
|---|---|---|---|
| 1671211 | 7/1965 | Fed. Rep. of Germany. | |
| 50-2608 | 1/1975 | Japan | 501/108 |
| 56-13649 | 3/1981 | Japan. | |

Primary Examiner—Mark L. Bell
Assistant Examiner—A. Knab
Attorney, Agent, or Firm—Finnegan, Henderson, Farabow, Garrett & Dunner

[57] ABSTRACT

The present invention disclosed a magnesia clinker excellent in corrosion resistance, which is useful for a magnesia carbon refractory and also for a refractory for steel manufacturing furnace, and the magnesia clinker is characterized by:

(a) having a purity of MgO of 97 wt. % or higher;
(b) containing 2.0 wt. % or less of CaO;
(c) containing 0.01 wt. % or more of $B_2O_3$;
(d) containing 0.3 wt. % or less of $SiO_2$;
(e) containing impurities other than MgO, CaO, $B_2O_3$ and $SiO_2$ of 2 wt. % or less;
(f) having a bulk density of 3.35 (g/cc) or higher and an apparent porosity of 3.0 (vol. %) or less; and
(g) having a mean crystal size of magnesia of 100 $\mu$m or larger.

4 Claims, 8 Drawing Figures

FIG. 1 pore in crystal | 100μ

MAGNESIA CLINKER AND METHOD OF PRODUCING THE SAME

BACKGROUND OF THE INVENTION

1. Field of the Invention

This invention relates to a magnesia clinker, particularly a sea water magnesia clinker, having excellent corrosion resistance, which is suitable as the starting material for a refractory for steel manufacturing furnace, particularly a refractory for converter such as magnesia carbon refractory.

2. Description of the Prior Art

Marked progresses have been noted in recent developments of steel manufacturing techniques, and correspondingly developments have been desired also for refractory for steel manufacturing furnaces. Thus, with the progress in steel manufacturing techniques, the refractory to be used for steel manufacturing furnace is required to be resistant under harsh conditions. Accordingly, expensive materials such as electrofused magnesia, which has scarcely been used in the prior art as the starting material for refractory for steel manufacturing furnace, are coming to be employed. Particularly, in the magnesia carbon refractory to be used as the refractory for converter, electrofused magnesia is frequently employed, and therefore less expensive calcined magnesia as substitute therefor (particularly sea water magnesia clinker) has earnestly been sought after. Sea water as herein mentioned refers only to sea water in the oceans in general, and bittern and brine are excluded therefrom.

The magnesia clinker suitable as the starting material for magnesia carbon refractory has been said to be one having large crystal sizes of magnesia, a high bulk density and a high MgO purity, and among those satisfying those conditions is particularly desired a magnesia clinker having large crystal sizes. Accordingly, as the magnesia source for magnesia carbon refractory, there was an attempt to use a magnesia clinker having a mean crystal diameter of about 80 $\mu$m alone or in combination with electrofused magnesia.

The term "clinker" as herein mentioned refers to a mass which is formed by melting the portion with lower melting points of the components generally by sintering and then solidifying the whole. In the prior art, there is well known the so called electrofused magnesia which is prepared by converting magnesia clinker, etc. into completely fused state by electrical heating, followed by solidification. However, as can be understood from the manufacturing step, electrofused magnesia is small in production amount and expensive. Accordingly, as a substitute material for electrofused magnesia, there had been a demand for magnesia clinker of large crystals and high bulk density. Whereas, as different from electrofused magnesia, the clinker prepared by calcination will inevitably contain minute amounts of impurities and pores and, due to the presence of such impurities and pores, there was involved the drawback that the crystal could hardly be grown.

Clinker is produced generally by molding magnesium hydroxide formed through the reaction between calcium hydroxide and sea water (or brine) as such or molding the powdery caustic magnesium obtained by calcining magnesium hydroxide or natural magnesite once at a temperature from 600° to 1000° C., followed by calcination at a high temperature of 1900° C. or higher. The magnesia clinker obtained by calcination had crystal sizes of 20 to 40 $\mu$m at the largest. Some magnesia clinker prepaed from the starting material of a magnesite containing large amounts of $Fe_2O_3$ and $SiO_2$ have crystal sizes of 60 $\mu$m or larger. However, any of these magnesia clinkers had a purity less than 97%.

As the method for increasing the crystal size of MgO in magnesia clinker, there is the method in which purity of MgO is enhanced and the method in which $ZrO_2$ is used as the additive, as disclosed in Japanese Laid-open Patent Publication No. 104054/1983. The method for enhancing MgO purity comprises hydrating magnesia calcined once at 800° C. to 1400° C., removing calcium oxide and calcining again the product, thereby increasing the purity of MgO to 99.5% or higher to give a magnesia clinker with high bulk density and large crystals. Even by this method, it is not possible to obtain a magnesia clinker having crystal sizes of 100 $\mu$m or larger, and besides the production cost is increased to a great extent due to the complicated step of removing calcium oxide.

Concerning the method employing an additive, a magnesia clinker having a mean crystal size of 60 $\mu$m or larger prepared by addition of $ZrO_2$ is disclosed in the pending patent application, but it was difficult to obtain a magnesia clinker with a mean crystal size of 100 $\mu$m or larger only by addition of $ZrO_2$.

SUMMARY OF THE INVENTION

An object of the present invention is to provide a magnesia clinker suitable as the starting material for a refractory for steel manufacturing furnace, particularly a magnesia carbon refractory excellent in corrosion resistance.

The present inventors, as a consequence of the extensive studies about the development of excellent magnesia clinker in view of the above object, have accomplished the present invention.

More specifically, the present invention provides (1) a magnesia clinker, characterized by:

(a) having a purity of MgO of 97 wt. % or higher;
(b) containing 2.0 wt. % or less of CaO;
(c) containing 0.01 wt. % or more of $B_2O_3$;
(d) containing 0.3 wt. % or less of $SiO_2$;
(e) containing impurities other than MgO, CaO, $B_2O_3$ and $SiO_2$ of 2 wt. % or less;
(f) having a bulk density of 3.35 (g/cc) or higher and an apparent porosity of 3.0 (vol. %) or less; and
(g) having a mean crystal size of magnesia of 100 $\mu$m or larger, and (2) a method for producing a magnesia clinker as specified above, which comprises incorporating single crystals or a mass of crystals of 5 or less having roundness and a mean grain size of 15 $\mu$m or larger into magnesium hydroxide or caustic magnesia in an amount of 0.2 to 20 wt. % as calculated on MgO and thereafter sintering the resultant mixture.

DESCRIPTION OF THE PREFERRED EMBODIMENTS

In the present invention, for improvement of durability of the refractory, MgO is required to have a purity of not lower than 97 wt. %. Further, a purity of 98 wt. % or higher is preferred. The content of CaO is particularly desirably 1.0 to 2.0 wt. %, while that of $B_2O_3$ particularly desirably 0.03 to 0.1 wt. %. On the other hand, the content of $SiO_2$ is particularly desirably 0.1 to 0.2 wt. %, and impurities other than MgO, CaO, $B_2O_3$ and $SiO_2$ desirably 1.0 wt. % or less.

And, the bulk density should be 3.35 g/cc or higher, more desirably 3.45 (g/cc) or higher and the mean crystal size of magnesia should be 100 μm or larger, particularly desirably 120 μm or larger, and the percentage of the number of crystals with sizes of 100 to 200 μm being 50% or more, particularly desirably 60% or more of the total number of crystals.

In this context, when the structure of a magnesia clinker is observed about its fractured surface by a microscope, it consists of a mass of small crystals of magnesia and a matrix intervening in among these crystals. The crystals of magnesia are called as crystal grains. In the case of a high purity magnesia clinker of the prior art, its mean size is ordinarily 20 to 40 μm. Whereas, the magnesia clinker of the present invention has a mean crystal size as large as 100 μm or higher, and yet the number of crystal grains with sizes of 100 to 200 μm comprising 50% or more of the total number of crystal grains, with its distribution being uniformized, and also having a high bulk density Accordingly, the magnesia clinker can be improved in corrosion resistance to slug. This is probably because corrosion of magnesia clinker by slug will occur more frequently through the matrix comprising CaO and $SiO_2$ rather than at the portion of magnesia crystal grains, and increase in grain size of magnesia crystal grains will obstruct contact of slug with the matrix. Also, corrosion of the magnesia clinker by slug may be considered to be further improved due to uniformized distribution of the magnesia crystal grains In the present invention, the number of the pores within the magnesia crystals is preferred to be $1000/mm^2$ or more. This means that the pore size per one pore is fine, provided that the bulk density is constant, whereby it may be estimated that penetration of slug into the pores can be prevented to impede progress of corrosion by slug.

Further, it is well known in the art that modification of a magnesia clinker to higher density contributes greatly to improvement of durability of a refractory, and marked improvement of corrosion resistance can be observed when the bulk density of the magnesia clinker is 3.35 (g/cc) or higher. Particularly, with a bulk density of 3.45 (g/cc) or higher, improvement by modification to higher density can further markedly be effected.

Accordingly, the magnesia clinker having large crystals satisfying the various conditions in the present invention can exhibit more excellent corrosion resistance to increase durability, and therefore it is suitable as the starting material for a magnesia carbon refractory. Also, it can suitably be used widely for various purposes, including the starting materials for refactories for converter such as magnesia dolomite refractory, magnesia chromium refractory, etc. and further starting materials for refactories for use in steel manufacturing furnaces.

The magnesia clinker of the present invention can be obtained according to, for example, the following procedure. That is, into a caustic magnesia produced by calcining magnesium hydroxide at 600° to 1200° C., magnesia powder for incorporation, namely magnesia single crystals or mass of crystals of 5 or less having crystal sizes of 15 μm or smaller are incorporated uniformly in an amount of 0.2 to 20 wt. %, the resultant mixture is pressure molded into the shape of almond under a pressure of 2 $t/cm^2$ or higher and the molded products are thrown into a rotary kiln to be sintered therein at the maximum temperature of 1800° to 2000° C., thereby producing the magnesia clinker of the present invention.

In the present invention, even when the magnesia single crystals or mass of crystals of 5 or less having crystal sizes of 15 μm or smaller are incorporated into magnesium hydroxide, followed by calcination at 600° to 1200° C., to prepare a caustic magnesia, the magnesia clinker of the present invention can be obtained from such a magnesia similarly as in the above procedure.

The magnesia to be incorporated should have a mean grain size of 15 μm or larger, particularly preferably from 30 to 100 μm.

The amount of the magnesia to be incorporated should desirably be 0.2 to 20.0 wt. %, particularly preferably 1.0 to 5.0 wt. %.

Figure 7:
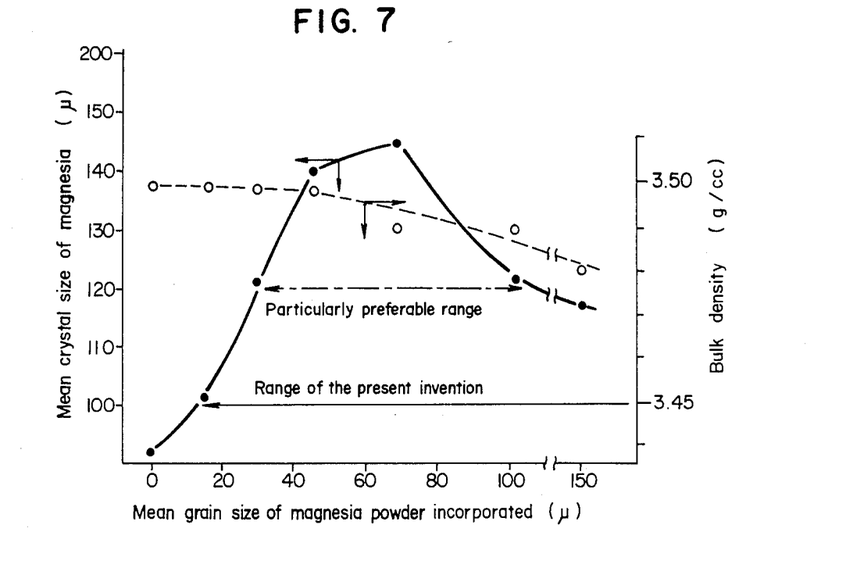
FIG. 7 is a graph showing the relationships between the crystal size of the magnesia powder incorporated and the magnesia crystal size of the magnesia clinker and the bulk density of the magnesia clinker after sintering.

If the magnesia to be incorporated has a mean grain size outside the range of the present invention, namely less than 15 μm, the effect by making greater the grain size of crystals in the magnesia clinker will become smaller. Also, with the content of the magnesia to be incorporated having a mean grain size of 15 μm or larger is less than 0.2 wt. %, the effect by making greater the grain size of crystals in the magnesia clinker will become smaller. On the other hand, an increased content over 20 wt. % will result in abrupt lowering in bulk density. More specifically, FIG. 7 shows the relationships of the mean grain size of the magnesia powder incorporated versus the bulk density and the mean crystal size of the magnesia clinker (after calcination), respectively, when the above magnesia powder for incorporation is incorporated in the caustic magnesia in an amount of 2 wt. % and sintered. Also as shown in this Figure, it is required that the magnesia powder for incorporation should have a mean grain size of 15 μm or larger, and a small mean grain size cannot give a magnesia clinker with a mean crystal size of 100 μm or larger. Further, it can also be noted that the particularly preferred range of the mean grain size of magnesia powder should be from 30 to 100 μm, whereby the mean grain size of the magnesia clinker can become 120 μm or higher.

Figure 8:
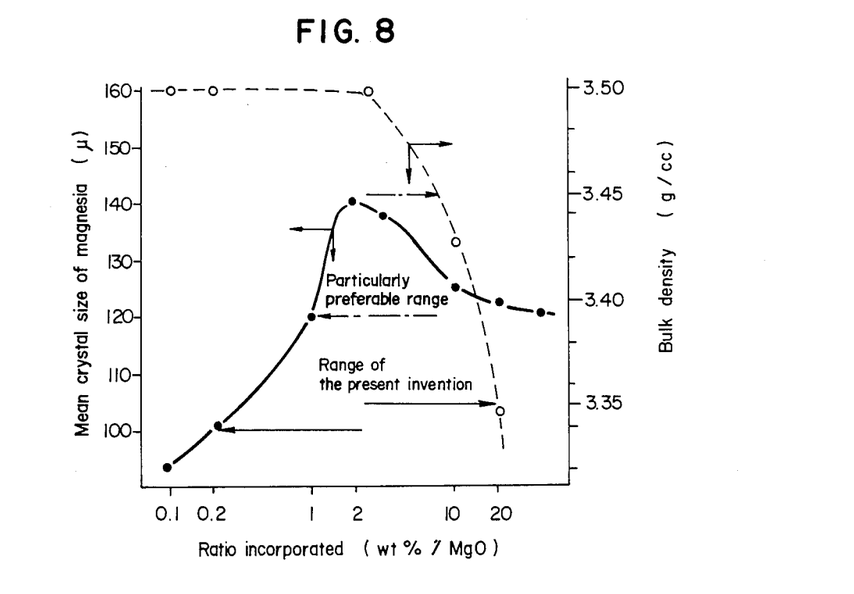
FIG. 8 is a graph showing the relationships between the ratio incorporated of the magnesia powder incorporated and the magnesia crystal size and the bulk density of the magnesia clinker after sintering.

And, FIG. 8 shows the relationships of the ratio of the magnesia powder incorporated versus the bulk density and the mean crystal size of the magnesia clinker, respectively, when the magnesia powder for incorporation as mentioned above having a mean grain size of 45 μm is incorporated into the caustic magnesia and thereafter sintered. As also shown in this Figure, when the ratio incorporated is 0.2 wt. % or more, a magnesia clinker with a mean crystal size of 100 μm or more can be obtained. On the other hand, at a level of 20.0 wt. % or less, a magnesia clinker having a bulk density of 3.35 (g/cc) or more can be obtained. Further, with a ratio incorporated ranging from 1.0 to 5.0 wt. %, it is possible to obtain a magnesia clinker having a mean crystal size of 120 μm or larger and a bulk density of 3.45 (g/cc) or higher. Thus, the ratio of the magnesia powder incorporated is required to be within the range from 0.2 to 20 wt. %, particularly preferably from 1.0 to 5.0 wt. %.

In the present invention, the shape of the magnesia to be incorporated should desirably be rounded like sphere or ellipsoid with very little amount of flat planes, and shapes with greater length ratio of longitudinal to transverse direction like a needle are not suitable for enlargement of crystals.

In the present invention, the growth of crystals can be further promoted by addition of $ZrO_2$. The amount of $ZrO_2$ added should preferably be from 0.05 to 0.5 wt. % based on MgO, further preferably from 0.1 to 0.2 wt. %.

Figure 3:
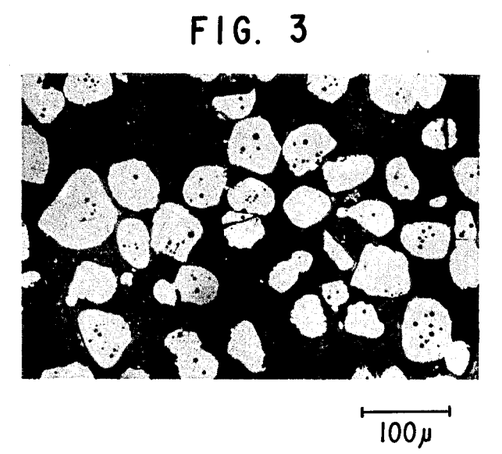
FIG. 3 is a reflective microscope photograph of the polished surface of the magnesia powder incorporated.
Figure 4:
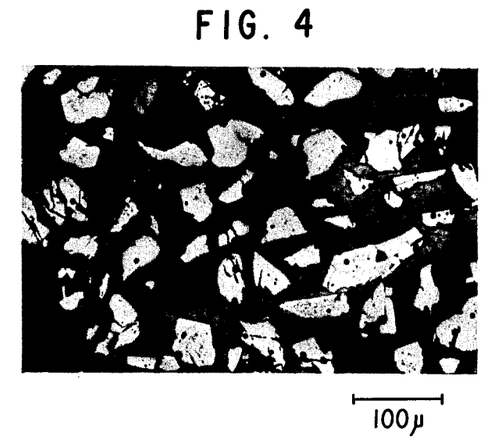
FIG. 4 is a reflective microscope photograph of the polished surface of the needle-like magnesia powder.

In the case of alumina, the thought to add an alumina with a mean grain size of about 10 μm for promotion of crystal growth has already been shown by I. B. Cutler ("KINETICS OF HIGH TEMPERATURE", edited by W. D. KINGERY, MIT PUBLISHER, 1959, p. 120). However, the shape of the magnesia to be added for promoting crystal growth in magnesia clinker with use of a magnesia for incorporation is particularly required to be scrutinized, and no effect of great crystal growth can be exhibited with use of a magnesia having a shape of a needle or similar thereto as shown in FIG. 4, which resembles the shape of the alumina added employed in the alumina crystal growth as shown by Cutler. Thus, as shown in FIG. 3, by incorporating a magnesia for incorporation having roundness, which is spherical or similar thereto in shape, the effect of greater crystal formation and other effects expected by the present invention can be realized.

Also, in the present invention, the magnesia powder for incorporation should preferably consist of masses each comprising 5 or less crystals, more preferably consisting of discrete single crystals, whereby its effect can be markedly obtained.

The magnesia powder for incorporation to be used in the present invention may include also those which are not subjected to special crushing treatment but merely powder under a state just taken out after burning at high temperature.

The bulk density and the crystal size, and the mean crystal size of the magnesia clinker obtained according to the present invention were measured according to the Gakushin Method 2 "Method for measuring apparent porosity, apparent density and bulk density of magnesia clinker" and the Gakushin Method 3 "Method for measuring the size of periclase in magnesia clinker and Method for its description", respectively, as proposed in the Committee 124 of Nippon Gakujutsu Shinkokai (Japanese Society for Development of Science and Technology).

On the other hand, chemical analyses of magnesium hydroxide, caustic magnesia and magnesia clinker were conducted according to the Gakushin Method 1 "Chemical Analysis of Magnesia Clinker"

More specifically, the bulk density and the apparent porosity of magnesia clinker are measured as follows.

(1) All the grains of magnesia clinker are crushed, and those having grain sizes of 3.36 to 2.00 mm are selected and weighed accurately in an amount of about 15 g ($W_1$:g).

(2) In a basket made of 1 mm-mesh metal screen is placed the magnesia clinker sample, a beaker containing this basket is placed in a dessicator wherein it is left to stand under vacuum for about one hour, followed by pouring of illuminating kerosine from a separatory funnel to fill the beaker therewith. Then, evacuation is effected for about 20 minutes.

(3) The beaker containing the sample evacuated is taken out from the dessicator, further the basket containing the sample from the beaker and its weight is accurately measured in oil ($W_2$:g).

(4) The sample is taken out from the basket, and after removal of the oil component attached on its surface in proper quantity, its weight is measured swiftly ($W_3$:g).

(5) Calculation:

$$\text{Bulk density (g/cc)} = \frac{W_1}{W_1 - (W_2 - W_4)} \times d$$

$$\text{Apparent porosity} = \frac{W_3 - W_1}{W_3 - (W_2 - W_4)} \times 100\ (\%)$$

wherein $W_4$: weight of only basket in oil;

d: specific gravity of illuminating kerosene.

The mean crystal size is measured as follows.

(1) At least three masses of about 7.93 mm are sampled, divided approximately into two and a resin is embedded in between the cut surfaces.

(2) While observing the sample polished on its surface by a reflective microscope, three average portions are chosen and the lengths in the vertical and lateral directions relative to the observer are measured.

(3) These lengths are regarded as the crystal sizes and a mean value thereof is determined as the mean crystal size.

Further, magnesium hydroxide, magnesium oxide and magnesia clinker are analyzed according to the method based on the Gakushin method 1 "Chemical Analysis of Magnesia Clinker", with partial improvement and addition.

$B_2O_3$ is analyzed on the basis of ASTM C-574 according to the following procedure (Mannitol method):

Sample 5 g
↓
dissolution (in Conc. HCl 25 ml, Conc. HNO₃ 1 ml)
↓
Neutralization (superfluous HCl neutralized with use of CaCO₃)
↓
Filtration
↓
Boiling [boiled with addition of 15 cc (1 + 120) HCl]
(Cooling) ↓
Measurement.

Using a pH meter, this solution is adjusted to pH 6.9 by addition of an aqueous NaOH solution. With addition of 10 g of mannitol, [HOCH$_2$-(CHOH)$_4$-CH$_2$OH], the solution is titrated with an aqueous (1+20) NaOH solution and the content of $B_2O_3$ is determined from the titrated amount.

Analysis of $ZrO_2$ is carried out as follows.

Sample 0.5 g (in platinum crucible)
↓
Melt in alkali (4 g of Na$_2$CO$_3$ and 2 g of Na$_2$B$_2$O$_3$ added)
↓
Dissolution (the content in platinum crucible dissolved in aqueous (1 + 3) HNO$_3$ solution)
↓
Titration (while heating the solution to be maintained at °C. with addition of several droplets of Xynol Orange indicator, titrated with M/100 EDTA solution).

The mean grain size of magnesia to be incorporated is measured as follows.

(1) Magnesia powder is embedded in an epoxy resin and its surface is polished.

(2) While observing the polished surface with a reflective microscope, the lengths of the grain in the vertical and lateral directions are measured.

(3) These lengths are regarded as the grain size, and a mean value thereof is determined as the mean grain size.

The number of pores within the magnesia crystal is measured as follows. That is to say, while observing the surface of a polished clinker by a reflective microscope, photographs are taken in the three fields of vision. Ten fields of visions each of 50 μm square are chosen from one photograph, and the number of pores with those fields are counted and calculated as the number per mm square. A mean value of ten fields of vision is determined for one photography and expressed with a number rounded to the nearest whole number at the column of 10. Further, a mean value is determined of the values from the three photographs. This value is expressed as the number of pores.

EXAMPLE 1

Figure 1:
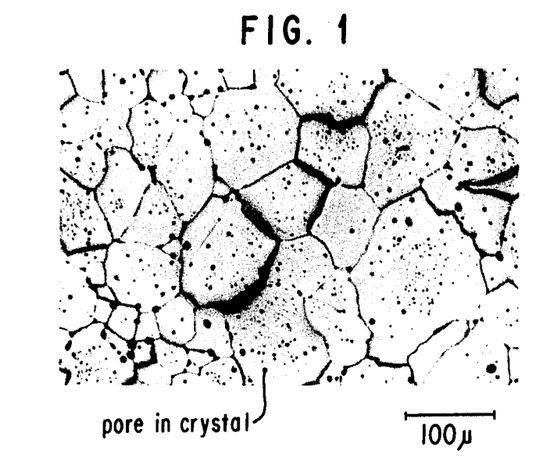
FIG. 1 and FIG. 2 show reflective microscope photographs (of the crystalline structures of the broken surfaces) of magnesia clinker.
Figure 5:
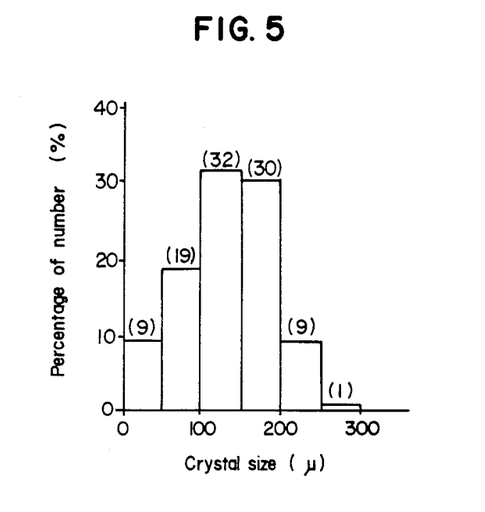
FIG. 5 and FIG. 6 are graphs showing the relationship between the crystal size and the percentage of number of magnesia clinker.

Into caustic magnesia obtained by maintaining a magnesium hydroxide having a chemical composition comprising 67.0 wt. % of MgO, 1.12 wt. % of CaO, 0.14 wt. % of $SiO_2$, 0.04 wt % of $Al_2O_3$, 0.04 wt % of $Fe_2O_3$, 0.06 wt. % of $B_2O_3$ and 0.09 wt. % of $ZrO_2$, as calculated on oxides, in a box-type electric furnace at 950° C. for 3 hours, 2 wt. % of magnesia for incorporation having roundness as shown in FIG. 3 with a mean grain size of 45 μm comprising masses of 5 or less crystals was incorporated and molded into pellets (diameter: 10 mm, height: 5 mm) under a pressure of 2t/cm$^2$, followed by heating in a oxygen-propane furnace at the maximum temperature of 2000° C. for one hour. The magnesia clinker thus obtained had the bulk density, the apparent porosity, the mean crystal size and the chemical composition as shown in Table 1. The broken surface of the clinker was polished, observed with a microscope and its appearance was shown in FIG. 1. Further, the crystal size distribution of the magnesia crystals of 150 or more in number read following the method of the Gakushin Method is shown in FIG. 5. The numeral in the bracket represents the percentage of number falling within the said crystal size.

The relationships between the mean grain size of the magnesia powder incorporated and the bulk density and the mean crystal size of the magnesia clinker are as shown in FIG. 7, and the relationships between the ratio incorporated of the magnesia clinker and the bulk density and the mean crystal size of the magnesia clinker are as shown in FIG. 8.

EXAMPLE 2

The magnesium hydroxide as employed in Example 1 was calcined in a multi-step calcining furnace at the maximum temperature to obtain caustic magnesia, into which was incorporated 3 wt. % of single crystals of magnesia having roundness and a mean grain size of 63 um as shown in FIG. 3, followed by molding into pellets shaped in almond under a pressure of 2t/cm$^2$ or higher. The pellets were sintered in a rotary kiln at the maximum temperature of 2000° C., and the magnesia clinker obtained had the bulk density, the apparent porosity, the mean crystal size and the chemical composition as shown in Table 1. The distribution of the crystal size of the magnesia clinker was observed to consist of crystals with crystal sizes of 100 to 200 μm which are 60% of the total number of the crystals.

EXAMPLE 3

Into caustic magnesia obtained by maintaining a magnesium hydroxide having a chemical composition comprising 68.0 wt. % of MgO, 0.04 wt. % of CaO, 0.19 wt. % of $SiO_2$, 0.04 wt % of $Al_2O_3$, 0.04 wt % of $Fe_2O_3$ and 0.06 wt. % of $B_2O_3$, as calculated on oxides, in a box-type electric furnace at 900° C. for 3 hours, 2 wt. % of single crystals of magnesia having roundness as shown in FIG. 3 with a mean grain size of 50 μm comprising masses of 5 or less crystals was incorporated and molded into columns (diameter: 10 mm, height: 5 mm) under a pressure of 2t/cm$^2$, followed by heating in an oxygenpropane furnace at the maximum temperature of 2000° C. for one hour. The magnesia clinker thus obtained had the bulk density, the apparent porosity, the mean crystal size and the chemical composition as shown in Table 1. The distribution of the crystal size of the magnesia clinker was observed to consist of crystals with crystal sizes of 100 to 200 μm which were 55% of the total number of the crystals.

EXAMPLE 4

Into the same magnesium hydroxide as used in Example 1 was incorporated a magnesia powder having roundness as shown in FIG. 3 comprising masses of crystals of 5 or less with a mean grain size of 45 μm, in an amount of 2 wt. % as calcualted on MgO, and the mixture was maintained in a box-type electric furnace at 900° C. for 3 hours to obtain caustic magnesia. The causytic magnesia was molded into columns (diameter: 10 mm, height: 5 mm) under a pressure of 2t/cm², followed by heating in a oxygen-propane furnace at the maximum temperature of 2000° C. for one hour. The magnesia clinker thus obtained had the bulk density, the apparent porosity, the mean crystal size and the chemical composition as shown in Table 1. The distribution of the crystal size of the magnesia clinker was observed to consist of crystals with crystal sizes of 100 to 200 μm which were 58% of the total number of the crystals.

EXAMPLE 5

The magnesium hydroxide having a chemical composition comprising 67.4 wt. % of MgO, 0.95 wt. % of CaO, 0.19 wt. % of $SiO_2$, 0.04 wt % of $Al_2O_3$, 0.04 wt % of $Fe_2O_3$ and 0.06 wt. % of $B_2O_3$, as calculated on oxides, was calcined in a multi-step calcining furnace at the maximum temperature of 900° C. Into caustic magnesia thus obtained was incorporated 2 wt. % of a magnesia powder having roundness as shown in FIG. 3 with a mean grain size of 48 μm comprising masses of 5 or less crystals and the resultant mixture molded into almonds (diameter: 10 mm, height: 5 mm) under a pressure of 2t/cm² or higher, followed by sintering in a rotary kiln at the maximum temperature of 2020° C. The magnesia clinker thus obtained had the bulk density, the apparent porosity, the mean crystal size and the chemical composition as shown in Table 1. The distribution of the crystal size of the magnesia was observed to consist of crystals with crystal sizes of 100 to 200 μm which are 52 % of the total number of crystals.

COMPARATIVE EXAMPLE 1

Figure 2:
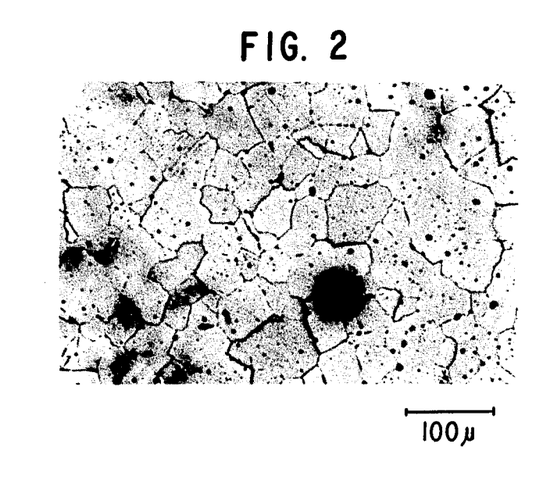
Figure 6:
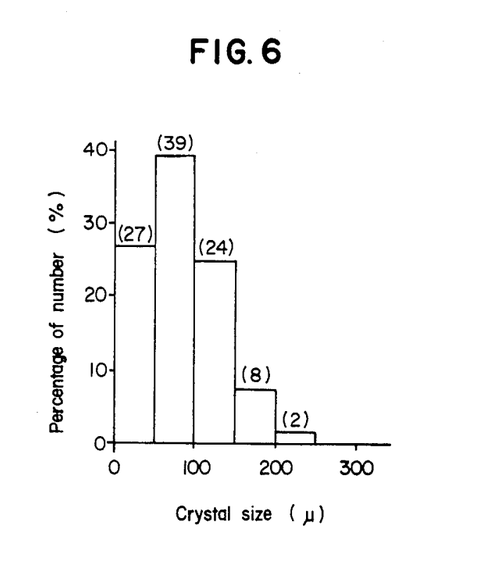

The columnar pellets (diameter: 10 mm, height: 5 mm) molded from caustic magnesia as used in Example 1 under a pressure of 2t/cm² were maintained in an oxygen-propane furnace at the maximum temperature of 2000° C. for one hour The magnesia clinker thus obtained had the bulk density, the mean crystal size and the chemical composition as shown in Table 1. The broken surface of the clinker was polished and observed with a microscope and its appearance was shown in FIG. 2. The distribution of the crystal sizes of the magnesia crystals is also shown in FIG. 6, similarly as in Example 1.

COMPARATIVE EXAMPLE 2

Into the same caustic magnesia as used in Example 1 was incorporated 2 wt. % of magnesia powder shaped in needles as shown in FIG. 4 with a mean grain size of 45 μm, and the mixture was molded into columnar pellets (diameter: 10 mm, height: 5 mm), which were then maintained at the maximum temperature of 2000° C. for one hour. The magnesia clinker thus obtained had the bulk density, the mean crystal size and the chemical composition as shown in Table 1.

Next, from each of the magnesia clinkers obtained in Examples 1 to 5 and Comparative examples 1 to 2, each about 5 g of cubic sample strip was cut out, placed in an electric furnace of 1570° C., pre-heated to the same temperature and thrown into 30 g of a slug (chemical composition: 43.2 wt. % of CaO, 23.9% of $SiO_2$, and 32.9 wt. % of $Fe_2O_3$) previously placed in a platinum crucible and molten in the furnace After left to stand at the same temperature for 4 hours, the sample was taken out from the crucible, and the slug attached was removed by permitting the sample to place on the brick in the furnace, followed by leaving to cool outside of the furnace under room temperature The weight loss was determined from the difference before and after the reaction of the sample with the slug as a measure of the corrosion of the clinker with the slug. The results are shown in Table 2.

As described above in detail, the magnesia clinker having large crystal sizes of the present invention exhibits excellent corrosion resistance and suitable of course for a magnesia carbon refractory and also for a refractory for steel manufacturing furnace.

Further, the present invention brings about the market effect that a magnesia clinker with large crystal sizes and a high bulk density of 3.35 (g/cc) or more can be produced according to a simple and inexpensive method in which magnesia powder having a mean grain size of 15 um or more is incorporated in magnesium hydroxide or caustic magnesia.

TABLE 1

|  | Examples | | | | | Comparative examples | |
| --- | --- | --- | --- | --- | --- | --- | --- |
|  | 1 | 2 | 3 | 4 | 5 | 1 | 2 |
| Bulk density (g/cc) | 3.50 | 3.49 | 3.52 | 3.50 | 3.48 | 3.50 | 3.47 |
| Apparent porosity (wt. %) | 0.42 | 0.54 | 0.42 | 0.45 | 0.78 | 0.45 | 1.20 |
| Mean crystal size (μm) | 140 | 114 | 115 | 125 | 128 | 87 | 90 |
| Chemical composition (wt. %): | | | | | | | |
| MgO | 97.8 | 97.8 | 99.5 | 97.9 | 98.0 | 97.8 | 97.9 |
| CaO | 1.70 | 1.65 | 0.06 | 1.60 | 1.38 | 1.70 | 1.60 |
| $SiO_2$ | 0.20 | 0.20 | 0.28 | 0.19 | 0.22 | 0.19 | 0.20 |
| $Fe_2O_3$ | 0.06 | 0.06 | 0.07 | 0.06 | 0.07 | 0.06 | 0.06 |
| $Al_2O_3$ | 0.06 | 0.06 | 0.07 | 0.06 | 0.08 | 0.06 | 0.06 |
| $B_2O_3$ | 0.042 | 0.058 | 0.023 | 0.040 | 0.057 | 0.045 | 0.045 |
| $ZrO_2$ | 0.15 | 0.20 | — | 0.15 | 0.20 | 0.15 | 0.15 |

TABLE 1-continued

| | Examples | | | | | Comparative examples | |
|---|---|---|---|---|---|---|---|
| | 1 | 2 | 3 | 4 | 5 | 1 | 2 |
| Pores in grain (number/mm²) | 12350 | 16540 | 17270 | 15330 | 18300 | 10730 | 12100 |

TABLE 2

| | Examples | | | | | Comparative examples | |
|---|---|---|---|---|---|---|---|
| | 1 | 2 | 3 | 4 | 5 | 1 | 2 |
| Weight loss (wt. %) | 10.5 | 11.0 | 10.0 | 14.0 | 13.5 | 19.5 | 19.0 |

I claim:

1. A magnesia clinker, characterized by:
   (a) having a purity of MgO of 97 wt. % or higher;
   (b) containing 2.0 wt. % or less of CaO;
   (c) containing 0.01 wt. % or more of $B_2O_3$;
   (d) containing 0.3 wt. % less of $SiO_2$;
   (e) containing imputites of 2 wt. % or less;
   (f) having a bulk density of 3.35 (g/cc) or higher and an apparent porosity of 3.0 (vol. %) or less;
   (g) having a mean crystal size of magnesia of 100 μm or larger; and
   (h) containing 0.05 to 0.5 wt % $ZrO_2$.

2. A magnesia clinker according to claim 1, wherein the number of pores within the crystals of magnesia is 1000/mm² more.

3. A magnesia clinker according to claim 1, wherein the crystals of magnesia with sizes of 100 to 200 μm comprise 50% more of the total number of the crystals.

4. A magnesia clinker according to claim 1 having a mean crystal size of magnesia of 120 μm or larger.

UNITED STATES PATENT AND TRADEMARK OFFICE
CERTIFICATE OF CORRECTION

PATENT NO. : 4,721,691
DATED : January 26, 1988
INVENTOR(S) : Fusao Kawano

It is certified that error appears in the above-identified patent and that said Letters Patent is hereby corrected as shown below:

In claim 2, column 12, line 17, after "$mm^2$" insert --or--.

Signed and Sealed this

Thirteenth Day of September, 1988

Attest:

DONALD J. QUIGG

Attesting Officer

Commissioner of Patents and Trademarks